Patented Nov. 10, 1931

1,831,034

UNITED STATES PATENT OFFICE

GEORG ROEDER, OF LEIPZIG, GERMANY

PROCESS FOR TESTING MILK FOR DERANGEMENTS IN ITS COMPOSITION

No Drawing. Application filed August 7, 1930, Serial No. 473,786, and in Germany August 26, 1929.

The normal composition of milk can undergo a change due to the most diverse influences. Such alterations are particularly dangerous when they are the result of udder ailments, in particular of mastitis, as the milk then becomes unappetizing on account of the admixture of leucocytes, leading frequently on account of its altered composition to trouble in the further treatment and, according to the united evidence of different authors, even to serious effects on the health of human beings, when the cause of the ailment reaches the alimentary canal. In particular, the milk of animals with udder complaints is particularly dangerous for infants and children.

It is consequently of great importance to be able to diagnose such udder complaints as soon as possible on the milking in order to prevent that the infected milk be mixed with healthy milk of other animals.

In addition to the alterations to be attributed to ailments, there are also other alterations which necessitate a rapid diagnosis. In this, the colostrum may be particularly mentioned which is given by the calving cow in the first few days after calving, and the mixing of which with other milk can easily make the whole milk useless for the purposes of cheese-making, and the like. As the colostral period is not always the same, there is the necessity for a simple and sure process enabling the end of the colostral period to be determined and with it the time from which the milk of the cow can be wholly or partially dealt in.

Various processes have already been proposed which, on the one hand, permit udder ailments and, on the other hand, the presence of the colostrum to be shown. It has not yet been possible, however, to find a so-called rapid method which can be carried out in a short time by unskilled persons, and will give a really useful result.

Thus, for example, colorimetric methods have been proposed to diagnose udder ailments, in which the milk from the different teats is treated with an indicator by means of which in the case of any trouble other colours than the normal one are produced; or it has been proposed to test the chlorine content of the milk in order to draw a conclusion from this as to the utility or the soundness of the milk. Such investigations of the separate test quantities by titrating, and the like, even when by means of the titration only the excess or deficiency with respect to a predetermined limiting value is all that has to be found, are somewhat troublesome and certainly cannot be carried out by unskilled persons. Furthermore, they take up a long time and offer no certainty of determining whether colostrum is present. On the other hand, it has already been found that with the presence of colostrum (as also with other derangements in secretions) a more or less strong production of oxygen takes place by the addition of a peroxide, while other properties of the colostrum do not differ from those of normal milk.

It has furthermore been found that with udder ailments, changes are shown simply at the defective teat, while contrary to this, alterations based on feed or other influences are always noticeable with all the teats.

The invention utilizes all this knowledge and known facts in order to provide a rapid method by which it is possible used by unskilled persons, to determine even on the milking whether this milk is suitable for use or not. The process, according to the invention, consists in the test portions taken separately from the four teats, being treated also separately, with a definite quantity of a test liquid consisting of a peroxide and an indicator, the transition range of which lies between $ph=6$ and $ph=8$, when with variations in the secretions (due to ailments) in the test quantities in question, changes of colour are shown which differentiate them in a characteristic manner with respect to the other test quantities, and may be accompanied by a simultaneous disengagement of oxygen, while in the presence of colostrum only the separation of oxygen takes place.

It is thus of importance with the process according to the invention that with the colorimetric method of color comparison used the samples separately taken from the four teats are, after the addition of the test liquid, compared between themselves, whilst in the known methods the separately taken samples from the four teats are each compared with a fixed color value.

When the milk is fresh and normal, there is produced a characteristic yellowish-green colour, while even with commencing and quite feeble secretion disturbances, the colour becomes markedly bluish-green. When in advanced cases the hydrogen ion concentration is greatly increased, which in itself in the early stages of udder ailments first decreases and then rapidly increases, there is produced a pure yellow colour.

Dibrom - thymol - sulfophtalein ("bromthymol blue") has been proved a particularly suitable indicator for these purposes, for the reason that this particular indicator is practically not influenced by the varying metal salts content of the milk. Furthermore, an alcoholic solution of the indicator causes in the case of marked udder complaints, in addition to the strong yellow coloration, a simultaneous flocky separation which permits a clearly defined distinction as compared with normal milk.

When this indicator is dissolved in alcohol, and, with a peroxide added thereto, is kept ready as a test solution, being added at any time in a definite quantity to the four teat samples, it is possible to determine at once, if necessary after simply shaking up, by comparison of the four samples whether any alterations exist in the milk, and whether these alterations are to be attributed on account of the differences in colour taking place to mastitis ailments, or the like, or by reason of the gas separation to the presence of colostrum. In this way, means are provided, within the sphere of an actual rapid method and by inexperienced persons, to test with certainty the milk as soon as it is milked.

Further steps can then be taken and, for example, in connection with the separation of oxygen in the presence of colostrum, by the aid of suitably graduated vessels the quantity of the separated gas may be determined and thus the alteration in the milk. Exact rules may then be established so that the investigator can tell both from the change of colour as also from the quantity of gas produced, whether the milk in question can still be used or whether this must not be dealt with.

The following is a preferred example for the solution used according to the invention:

The solution of the indicator contains 2 percent of hydrogen peroxid and 0.2 percent of "bromthymol blue" (di-bromthymolsulfophtalein), furthermore 15 to 16 percent by volume of ethyl-alcohol, by means of which on one hand the color is held in solution and on the other hand a rapid deterioration of the hydrogen peroxid is prevented. 1 ccm. of this solution is added to 5 ccm. of milk.

What I claim and desire to secure by Letters Patent of the United States is:

1. Process for the testing of milk for variations from normal secretion conditions, in particular for testing for ailments (mastitis) and for finding the end of the colostral period, consisting in taking simultaneously samples from the four udder teats, adding to each of these four samples a certain quantity of a peroxide and an indicator, and then comparing the four samples with each other.

2. Process for the testing of milk for variations from normal secretion conditions, in particular for testing for ailments (mastitis) and for finding the end of the colostral period, consisting in taking simultaneously samples from the four udder teats, adding to each of these four samples a certain quantity of a peroxide and an indicator, the transition stage of which lies between $ph=6$ and $ph=8$, and then comparing the four samples with each other.

3. Process for testing of milk for variations from normal secretion conditions, in particular for testing for ailments (mastitis) and for finding the end of the colostral period, consisting in taking simultaneously samples from the four udder teats, adding to each of these four samples a certain quantity of a peroxide and dibrom-thymol-sulfophtalein ("bromthymol blue"), and then comparing the four samples with each other.

4. Process for the testing of milk for variations from normal secretion conditions, in particular for testing for ailments (mastitis) and for finding the end of the colostral period, consisting in taking simultaneously samples from the four udder teats, adding to each of these four samples a certain quantity of a peroxide and dibrom-thymol-sulfophtalein ("bromthymol blue") both substances being composed to a single testing liquid, and then comparing the four samples with each other.

5. Process for the testing of milk for variations from normal secretion conditions, in particular for testing for ailments (mastitis) and for finding the end of the colostral period, consisting in taking simultaneously samples from the four udder teats, adding to each of these four samples a certain quantity of a peroxide and dibrom-thymol-sulfophtalein ("bromthymol blue") both substances being composed to a single testing liquid by dissolution in alcohol, and then comparing the four samples with each other.

GEORG ROEDER.